Figure 1:
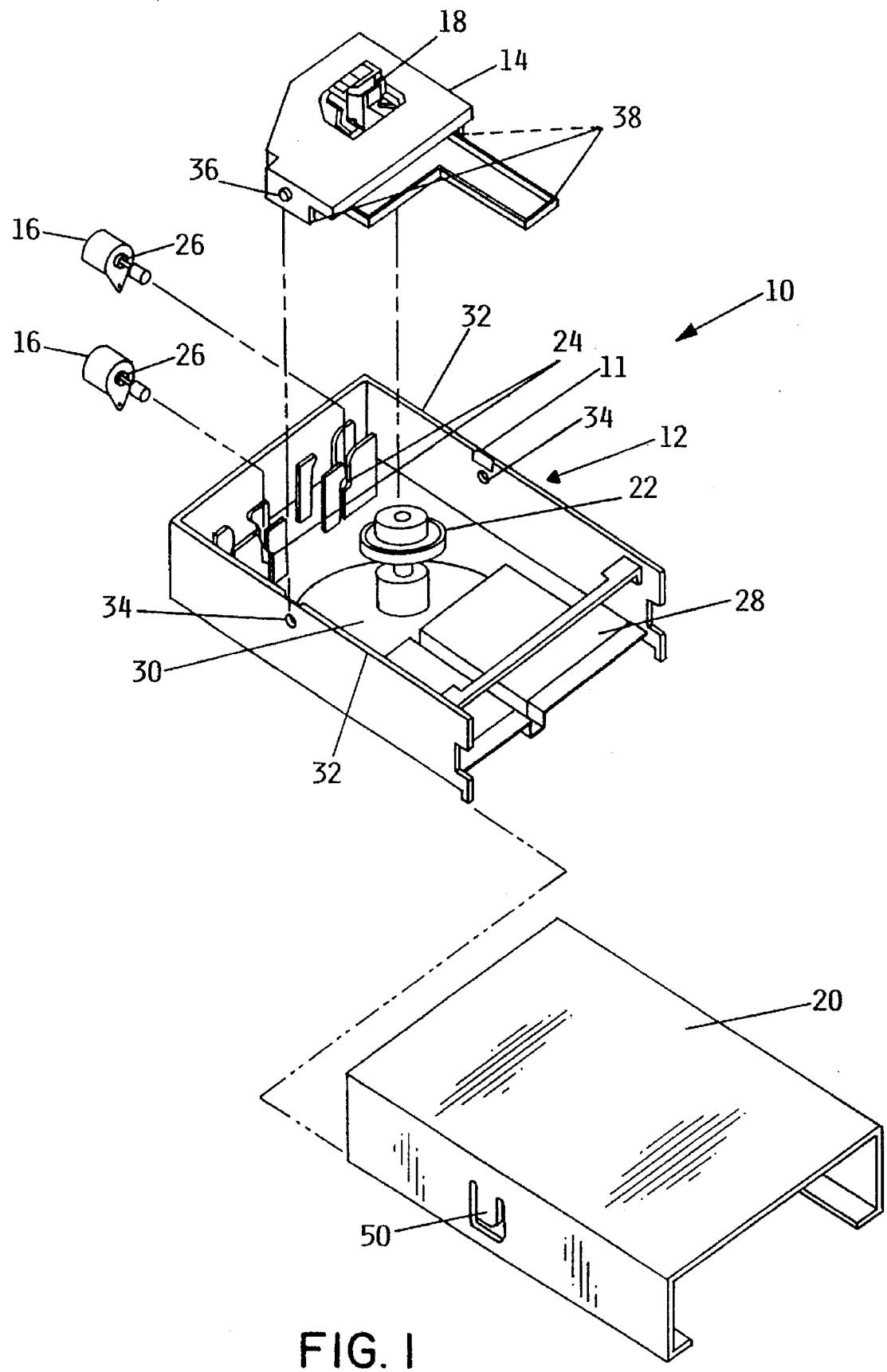

United States Patent [19]
Eckberg et al.

[11] Patent Number: 5,659,441
[45] Date of Patent: Aug. 19, 1997

[54] MECHANICAL DEVICE ENCLOSURE FOR HIGH PERFORMANCE TAPE DRIVE

[75] Inventors: Eric Alan Eckberg; Gerald Daniel Malagrino, Jr., both of Rochester; Brian Lee Rappel, Grand Meadow; Thomas Donald Weller, Rochester, all of Minn.

[73] Assignee: International Business Machines Corporation, Armonk, N.Y.

[21] Appl. No.: 484,626

[22] Filed: Jun. 7, 1995

[51] Int. Cl.$^6$ .................................................. G11B 33/08
[52] U.S. Cl. ............................................ 360/96.1; 369/75.1
[58] Field of Search ............................. 360/96.1–96.5, 360/97.01–97.04; 369/77.1, 77.2, 75.1, 244, 247

[56] References Cited

U.S. PATENT DOCUMENTS

| | | | |
|---|---|---|---|
| 4,156,260 | 5/1979 | Joshi | 360/96.1 |
| 4,199,795 | 4/1980 | Hunter | 360/93 |
| 4,303,955 | 12/1981 | Kramer et al. | 360/93 |
| 4,561,610 | 12/1985 | Gyi | 242/198 |
| 4,608,615 | 8/1986 | Zeavin | 360/96.5 |
| 4,665,451 | 5/1987 | Aldenhoven | 360/96.1 |
| 4,757,399 | 7/1988 | Peterson et al. | 360/96.5 |
| 4,807,067 | 2/1989 | Spiegelstein | 360/93 |
| 4,827,363 | 5/1989 | Takashima et al. | 360/96.1 |
| 4,866,552 | 9/1989 | Nagase | 360/96.5 |
| 5,025,334 | 6/1991 | Perona et al. | 360/96.5 |
| 5,237,469 | 8/1993 | Kukreja et al. | 360/93 |
| 5,251,086 | 10/1993 | Beisner et al. | 360/106 |
| 5,316,235 | 5/1994 | East et al. | 242/199 |
| 5,331,484 | 7/1994 | Klos-Hein et al. | 360/96.5 |

FOREIGN PATENT DOCUMENTS 63-50994  3/1988  Japan.

*Primary Examiner*—Stuart S. Levy
*Assistant Examiner*—William R. Korzuch
*Attorney, Agent, or Firm*—Laurence R. Letson

[57] ABSTRACT

A tape drive is fabricated with a chassis and a bridge. The bridge acts to support the read/write head actuator and to also define the datum surfaces for locating a mating magnetic tape cartridge. The bridge is manufactured of materials which are highly rigid and stable dimensionally. The chassis of the tape drive is fabricated from materials such as plastics which are relatively flexible and do not have the rigidity of that characterized by the bridge. The more flexible chassis of the tape drive permits the isolation of distortions and distortionary forces in the chassis and does not transmit those forces and distortions to the bridge. The effect of the two piece arrangement is that the pieces may be made relatively inexpensively and retain reliability of much more expensive materials in manufacturing processes herefore considered necessary. The electronic circuits associated with and part of the tape drive may be protected by fabricating the bridge of an electrically conductive material and grounding it to insure that the chances for electromagnetic and electrostatic discharge are minimized.

7 Claims, 1 Drawing Sheet

MECHANICAL DEVICE ENCLOSURE FOR HIGH PERFORMANCE TAPE DRIVE

RELATED PATENT APPLICATIONS

This application is related to U.S. patent application Ser. No. 08/489,462 filed on even date herewith, titled: Actuator For Servo Actuated Tape Drive, by Eric A. Eckberg et al. U.S. patent application Ser. No. 08/474,227 filed on even date herewith, titled: Hybrid Actuator Servo Actuated Tape Drive, by Eric A. Eckberg et al.; and U.S. patent application Ser. No. 08/472,829 filed on even date herewith, titled: Lockout Feature For Servo Actuated Tape Drives, by Eric A. Eckberg et al.

FIELD OF THE INVENTION

This invention relates to tape drives and more particularly to tape drives of the type which record data with very high densities.

BACKGROUND OF THE INVENTION

Mechanical enclosures for high performance tape drives have been made of metal to insure accuracy and rigidity necessary to precisely position the cartridge. In prior tape drives where data recording density requirements have not been as high or demanding, the rigidity and the control of the locating dimensions and locating surfaces of the drive and drive housing are not as in high performance tape drives because the positioning of the magnetic tape cartridge and tape, and the magnetic heads are more forgiving for lower density recording.

With the advent of servo controlled read/write head positioning and the introduction of a cartridge having magnetic tape with servo control tracks recorded on the tape, the requirements for precision in the locating surfaces and for positioning the cartridge relative to the components of the tape drive which interface with the tape have become considerably more restrictive in order to make cartridges which are recorded on one drive readable on another drive and to insure reliable reading and writing operations in all drives.

One will appreciate that the manufacture of precision parts is well within the capability of present manufacturing skills but is very costly due to the degree of accuracy required. Typically, frames of precision tape drives have been fabricated from metal and are well known but present cost and manufacturability problems exist. The metal frames can be reduced in weight, but the rigidity and stability is compromised with continued reduction in the amount of material within the frame itself. Further, when the drive is assembled into the computer or other cabinet of the host equipment, the attachment of a tape drive enclosure with insufficient rigidity may result in distortion sufficient that the actuator may be deviated from a design position and thus degrade the operation or reliability of the tape drive.

The deformation which is so detrimental to reliable and repeatable tape drive operation can be a result of forces exerted on parts of the tape drive during installation in the host computer, assembly of parts to form the tape drive, or thermal stresses resulting from ambient temperature change or temperature rise during the operation of the device. With the trend toward making devices that rely on snap-together and non-fastener assembly wherever possible, the stresses of forcing components into snap-in retainers creates stresses in the assembly which may migrate and cause undesirable distortions which in turn may result in unreliable operation or in the failure of a high performance tape drive.

Further, because the positioning of the magnetic tape cartridge at a precisely defined and controlled position relative to the remainder of the tape drive is required for repeatability and reliability, distortions cannot be tolerated within the tape drive frame which could effect the positioning of the datums against which the magnetic tape drive cartridges are located.

The use of plastics for the enclosure is highly desirable due to cost saving and ease of manufacturing when compared with precision made machined metal parts. The use of plastics, a typical and preferred cost reduction approach, has not been particularly successful in high precision tape drives because plastics easily distort and may render the device unreliable. In order to secure adequate rigidity of the frame of the tape drive, any frame manufactured of plastics must be of such bulk as either to prevent the tape drive from accepting the cartridge or to prevent the tape drive from fitting within the required form factor.

While prior metal frames and supports in the tape drive housings provide adequate protection against electromagnetic or electrostatic discharge, metal frames have those disadvantages as described. Use of plastic materials in the chassis and/or bridge requires an approach to insure that the electromagnetic or electrostatic discharges which are occasioned by static charge build-up on the cartridge or tape do not damage the electronic components of the read/write head or circuits associated with the tape drive. A static charge buildup may be either the result of a person having a static charge on his body handling the cartridge or from spooling the tape within the cartridge and drive.

OBJECTS OF THE INVENTION

It is an object of the invention to eliminate the effect of distortions in the frame of the tape drive.

It is another object of the invention to isolate the distortion sources in the tape in a portion thereof that is relatively more accommodating of distortion and to form the portion of the tape drive which requires more rigidity to accommodate the assembly of components which are not significant sources of deformation.

It is a further object of the invention to form the portion of the tape drive most susceptible of electromagnetic or electrostatic discharge by using a material which is not only easily fabricated but electrically conductive.

SUMMARY OF THE INVENTION

The shortcomings of the prior art tape drives are overcome and the objects of the invention accomplished by dividing the frame of the drive into at least two distinct portions. The two portions of the frame are formed of materials having a defined relationship to each other. The chassis is preferably formed of a plastic which is relatively less rigid than the material from which the bridge is fabricated. The less rigid chassis absorbs the deformations caused by the mounting of components on the chassis and the mounting of the chassis in the host apparatus and thus shields the bridge portions from the stresses which could deform the bridge. The chassis provides the mounting points for attaching the tape drive into the host structure and absorbs or accommodates the mounting force induced distortions such as those caused by clamping, bolting, or screwing the tape drive to the host structure frame. The chassis further utilizes the snap-in approach to mounting the cartridge load/unload motor and the actuator stepper motor. Although mounting motors using this approach are inexpensive and efficient, the deformation of motor mounts to insert the motors and to retain them in their proper position leads to stresses within the chassis that may further deform other portions of the chassis. The strength and stability of the plastic of the chassis are enhanced by glass fiber loading while maintaining sufficient flexibility to isolate deformation and stress from the bridge.

With substantially all of the induced stresses and deformations isolated in the chassis, the bridge or cartridge locating portion of the frame may be fabricated of a more rigid, less absorbing material such as metal or plastic loaded with a substantial percentage of carbon. The bridge then can be made of a highly rigid plastic which is loaded with a conductive material such as carbon. Carbon is a desirable loading component for the plastic because the carbon contributes to the rigidity or stiffness of the plastic as well as provides electrical conductivity.

With the bridge being more rigid than the frame, the locating or datum surfaces may be precisely defined and positioning a tape cartridge against the datum surfaces may be reliably repeated.

Further, the devices which require precise positioning relative to the tape may be attached to the bridge with reliance on the dimensional stability of the assembly.

A better understanding of the invention may be had from the drawing and the attached description .of the invention to follow.

DRAWING

The FIGURE illustrates a partially exploded view of the tape drive with the motors and the bridge exploded away from the chassis for a visibility.

DETAILED DESCRIPTION OF THE BEST MODE OF THE PREFERRED EMBODIMENT OF THE INVENTION AS CONTEMPLATED BY THE INVENTORS FOR CARRYING OUT THE INVENTION.

Referring to the drawing, a magnetic tape drive 10 is illustrated with the chassis 12 and the bridge 14 exploded apart. Also exploded and removed from chassis 12 are stepper motors 16 which are used to drive the read/write head actuator assembly 18 and the cartridge insert/reject drive (not shown).

Further exploded from the tape drive 10 is cover 20 formed of sheet metal to perform the dual function of physical protection and electrical shielding and grounding as will be discussed below. Tape drive 10 and cover 20 form an enclosure which provides the desired benefits of stress absorption and deformation insulation.

Chassis 12 provides the mounting surfaces and the mounting support function for capstan drive 22. The mounting surfaces may be screw or boltholes or other conventional mounting regions (not shown). Capstan drive 22 is supported within the chassis 12 to engage the magnetic tape of the magnetic tape cartridge (not shown). The chassis 12 is further provided with snap-in mounts 24 which accept and support the stepper motors 16. As one will appreciate whenever the stepper motors 16 are inserted into the snap-in mounts 24, bushings 26 on stepper motors 16 will spread and deform snap-in mounts 24 sufficiently to permit insertion of the bushings 26 as well as create enough deformation force to retain bushings 26 and, therefore, stepper motor 16 within the chassis 12 in the desired location.

Chassis 12 further acts as the support for bridge 14. In addition, chassis 12 whenever assembled with all the other parts of the tape drive 10 provides the mounting capability for attaching the entire assembled tape drive 10 to the framework of the host computer housing. The forces of mounting the tape drive 10 to the framework of the host computer housing (not shown) thus are exerted onto chassis 12. In order to accommodate the various forces of the assembly and mounting of the tape drive 10, the chassis 12 is preferably injection molded using a plastic which has a very high strength, at least partially derived from a plastic material being loaded with approximately 20% glass fibers. The plastic material selected for the molding of the chassis 12 should have some flexibility to it and be relatively more flexible than the material of the bridge 14 as will be discussed later. The flexibility of the chassis 12 permits warpage and distortion within the chassis 12 without causing a corresponding displacement of critical surfaces, on the bridge 14, used for locating the magnetic tape cartridge (not shown) when inserted into the tape drive 10 through opening 28. The capstan drive 22 is inserted into capstan motor mount 30 which similarly causes distortion since the arrangement of the parts and its assembly is designed to be a snap together or snap-in type of assembly, relying on chassis 12 deformation to generate the force required to retain capstan drive 22 on chassis 12.

The chassis 12 accommodates the deflections, deformations, and distortions created by assembling the various parts including capstan drive 22, stepper motors 16, and bridge 14 into the tape drive 10. Since the chassis 12 has a degree of flexibility and can be readily deformed, the assembly of the bridge 14 into the tape drive 10 is accomplished by spreading walls 32 and thereby dislocating journal holes 34 outwardly thus permitting the insertion of journals 36 (only one shown) into journal holes or bearing 34. By controlling the relative diameters of journal holes or bearings 34 and journal 36, the fit may be relatively tight for accurate positioning. Accurate positioning is desirable but not absolutely essential at this point of engagement, since all the datum locating surfaces 38 which engage the mating or facing portions of the magnetic tape cartridge (not shown) are all part of bridge 14. With the datum surfaces 38 a part of bridge 14, the distortions and deflections in portions of the chassis 12 are isolated from and immaterial to the proper operation of the tape drive 10. Further actuator 18, which controls the position of the magnetic read/write head relative to the magnetic tape of the tape cartridge (not shown) is precisely positioned relative to the bridge 14 and datum surfaces 38.

In order to assure continued accurate relative placement of the datum surfaces 38 and the actuator assembly 18 relative to bridge 14, bridge 14 is preferably manufactured of an injected molded plastic which has approximately 40% carbon loading. The carbon loading of the plastic enhances the stiffness or rigidity of the bridge 14 while at the same time provides electrical conductivity to the bridge At least some of the datum surfaces 38, whenever they engage the magnetic tape cartridge will serve as contact points to bleed the static charges from the cartridge either upon insertion or during the spooling of the tape.

The carbon loading of the plastic utilized in forming the bridge 14 adds significant rigidity to the plastic, a desirable attribute since the bridge 14 must maintain stability with respect to the relative dimensions and placements of components thereon such as the actuator assembly 18 and the datum surfaces 38. Accordingly, it is desirable and necessary in this invention for the bridge 14 to exhibit a much more rigid characteristic than the chassis 12 in order that the chassis 12 serves to isolate the bridge 14 from the distortions created in the tape drive 10 by assembly, thermal expansion and contraction caused either by the change in the ambient conditions in which the tape drive 10 is resident or a rise in the temperature within the tape drive 10 during operation. As an example of the relative rigidity of the chassis 12 and bridge 14, the material used for the bridge 14 is preferably polyphenylene sulfide with 40% carbon fiber and 10% polytetrafluoroethylene which has a modulus of elasticity of $3.9 \times 10^6$ psi in flexure; and the material preferably used in the chassis is polycarbonate with 20% glass fibers and having a modulus of elasticity of $0.8 \times 10^6$ psi in flexure.

By being more rigid than the chassis 12, bridge 14 is particularly suited to maintaining dimensional stability and continuously meeting the operating parameters required of the tape drive 10. Alternatively, the bridge may be fabricated of a metal such as aluminum.

Cover sleeve 20 is provided with a spring finger 50 formed in the side walls of the cover 20. Spring finger 50, due to its formation of a flat sheet metal material, forms a spring and may be deformed generally outward to clear the end of journal 36. The natural restorative force of spring finger 50 then will cause spring finger 50 to engage journal 36 and form a reliable grounding contact. The cover sleeve 20 then may be grounded to the frame of the host computer housing to provide an adequate shield and ground path for electrostatic discharge or electromagnetic discharge, thereby protecting the electronic components of the tape drive 10.

One piece tape drive frames do not provide the isolation characteristics provided by the chassis 12 and bridge 14. If a frame is a one piece item, any distortion in the frame may be transmitted through the frame to the elements corresponding to the datum surfaces 38 and the positioning of actuator 18. Also it is important to isolate the components and forces that may cause deformations in the chassis 12.

While only the bridge 14 is described as being electrically conductive, occasioned by the loading of the plastic material with carbon, the chassis 12 could be electrically conductive if desired. However, electrical conductivity in chassis 12 is not necessary and therefore the cost of carbon loading of the material for the chassis 12 is generally not warranted.

One of skill in the art will appreciate that minor modifications and changes may be made to the fabrication of the tape drive 10 without removing it from the scope of the claims which are attached and which define the extent of the invention.

We claim:

1. A high performance, high data density tape drive comprising:
    a magnetic read/write head and head positioning assembly,
    a bridge supporting said head positioning assembly, said bridge comprising a plurality of datum surfaces for engagement with a magnetic tape cartridge;
    said head positioning assembly driveable to position said head variously relative to said bridge;
    a chassis, said chassis supporting said bridge;
    said chassis comprising a first assembly structure;
    said bridge including a second assembly structure mateable with said first assembly structure of said chassis;
    said chassis supporting at least a drive for said magnetic read/write head positioning assembly;
    said bridge moveable about said mated first and second assembly structures with respect to said chassis;
    wherein said bridge is fabricated of a material having a modulus of elasticity substantially greater than the modulus of elasticity of the material of said chassis; and
    wherein said second assembly structure of said bridge comprises projections extending from said bridge and where the distance between ends of said projections exceed the width dimension of said chassis and said first assembly structure of said chassis comprises apertures configured to accept said projections;
    whereby said chassis and said bridge assembly structures isolate deformation stresses and associated distortions of said chassis from said bridge.

2. The high performance, high data density tape drive of claim 1 wherein said bridge is fabricated of an electrically conductive material.

3. The high performance, high data density tape drive of claim 1 wherein a ratio of said modulii of elasticity is at least 2.

4. The high performance, high data density tape drive of claim 1 wherein said chassis accommodates and supports all components of said tape drive which contribute to assembly and mounting deformations in said tape drive.

5. The high performance, high data density tape drive of claim 1 wherein said bridge is fabricated of aluminum.

6. The high performance, high data density tape drive of claim 1 wherein said bridge is fabricated of carbon-loaded plastic.

7. The high performance, high data density tape drive of claim 1 wherein said bridge is fabricated of metal.

* * * * *